United States Patent [19]

Downing et al.

[11] 4,218,546

[45] Aug. 19, 1980

[54] POLYESTER RESINS

[75] Inventors: Brian Y. Downing, Kingswinford; George D. Hamer, Birmingham, both of England

[73] Assignee: British Industrial Plastics Limited, Manchester, United Kingdom

[21] Appl. No.: 842,269

[22] Filed: Oct. 14, 1977

[30] Foreign Application Priority Data

Oct. 16, 1976 [GB] United Kingdom ............... 43076/76

[51] Int. Cl.$^2$ ............................................. C08L 67/06
[52] U.S. Cl. .................................. 525/170; 156/332; 427/389.8
[58] Field of Search ......................... 260/862; 525/170

[56] References Cited

U.S. PATENT DOCUMENTS

| | | | |
|---|---|---|---|
| 3,014,001 | 12/1961 | Murray | 260/28.5 |
| 3,225,117 | 12/1965 | Harper | 260/872 |
| 3,449,468 | 6/1969 | Vrotney et al. | 260/862 |
| 3,701,748 | 10/1972 | Kroekel | 260/862 X |
| 3,879,318 | 4/1975 | Forsyth | 260/862 X |
| 4,008,294 | 2/1977 | Marans et al. | 260/860 |

FOREIGN PATENT DOCUMENTS

| | | |
|---|---|---|
| 2410787 | 9/1974 | Fed. Rep. of Germany . |
| 7603207 | 9/1976 | Netherlands . |
| 882687 | 11/1961 | United Kingdom . |
| 1449735 | 9/1976 | United Kingdom . |
| 1482900 | 8/1977 | United Kingdom . |

OTHER PUBLICATIONS

Penn, *GRP Technology* (Maclaren 1966), p. 220.
Miles, *Polymer Technology* (Temple, 1965), pp. 67, 68, 70.
Brewster et al., *Organic Chemistry*, 3 Ed., (Prentice-Hall, 1961). pp. 353–355.
Penn, *GRP Technology* (Maclaren & Sons Ltd. 1966), pp. 143–145.

*Primary Examiner*—J. Ziegler
*Attorney, Agent, or Firm*—Stevens, Davis, Miller & Mosher

[57] ABSTRACT

A polyester resin composition comprising a thixotropic solution of an unsaturated polyester resin in a volatile monomer containing also a polymer which is partially incompatible with the polyester resin solution i.e. forms a hazy solution in it. The partially incompatible polymer can be a polymer of an ester of an unsaturated carboxylic acid.

4 Claims, No Drawings

POLYESTER RESINS

This invention relates to polyester resins.

Many unsaturated polyester resins in current use are used in the form of a solution of the polyester in a liquid unsaturated monomer such as styrene. Such monomers as styrene being relatively volatile liquids the emission of monomer vapour from the resin presents an environmental problem.

We have now found that by adding certain polymeric materials to the resin solution the level of monomer vapour emission can be substantially reduced.

According to the present invention a polyester resin composition comprises a thixotropic solution of an unsaturated polyester resin in a volatile monomer and, in admixture therewith, a polymer which is partially incompatible (as hereinafter defined) with the polyester resin solution.

In this specification the expression "partially incompatible" with the polyester resin solution is used to indicate a polymer which can be dissolved in the polyester resin solution but which will not yield a clear solution, i.e. giving a hazy solution, and will not separate out of the solution on standing.

Preferably the "partially incompatible" polymer is a polymer of an alkyl, aryl or aralkyl ester of an unsaturated mono- or di-basic carboxylic acid, preferably an $\alpha\beta$ unsaturated acid. Examples of such polymers which have been found particularly effective are the polymers of dibutyl fumarate, 2 ethyl hexyl acrylate, didecyl itaconate, hexyl methacrylate and butyl acrylate. On the other hand the polymer of methyl methacrylate is compatible with unsaturated polyester resin solutions and has been found ineffective to supress vapour emissions from them.

Preferably the content of said partially incompatible polymer in the composition is in the range 0.001% to 10% by weight, and more preferably 0.01% to 1.0% by weight.

The polyester is not critical and may be any unsaturated polyester which can be utlized as a solution in liquid monomer.

The preferrred ester polymers are formed by addition polymerization using the carbon-carbon unsaturation e.g. by heating the ester with a free-radical initiator such as a peroxide. The preferred polymer is poly (dibutylfumarate).

It will have been noted that the resin solutions provided in this invention are thixotropic. We have found that neither the addition of thixotropic additives alone nor the addition of a partially incompatible polymer alone to the polyester solution provides any significant suppression of monomer vapour emission. When the partially incompatible polymer is added to a thixotropic polyester solution the monomer vapour suppression effect can be considerable. The effect initially increases rapidly with thixotropic index as the latter is increased from 1.0, and the rate of increase in effect falls away with increasing thixotropy until at a thixotropic index of 2.2 to 2.4 there is very little difference. Thus the thixotropic index of the polyester resin solution is preferably at least 1.3.

The amount of volatile monomer in the polyester solution is generally of the order of 35 to 45 percent by weight in solutions of this kind but may be as low as 20 percent or as high as 60 percent if desired.

The invention will now be described in more detail by means of the following Examples:

EXAMPLE 1 i Preparation of the Polyester Resin

An unsaturated polyester resin was prepared by condensing the following materials together at 200° C. until a resin with an acid value of 30–50 mgms of KoH/g of solid resin was obtained.

1.545 moles ethylene glycol
1.545 moles propylene glycol
2.0 moles phthalic anhydride
1.0 moles Maleic anhydride The resin was dissolved in styrene to form a solution containing 57.5% by weight of resin and 42.5% by weight of styrene to which were added 0.008% by wt. of hydrogenated castor oil as thixotropic additive, and 0.15% by wt. of a promotor consisting of Cobalt siccatol containing 10% by wt. cobalt metal.

ii Preparation of Poly (dibutyl fumarate) (PDBF)

A polymer was prepared by heating dibutyl fumarate at 73°–77° C. in the presence of benzoyl peroxide until the product had a viscosity of 12 poise at 25° C. the determination of viscosity being carried out on an 80% solution of the polymer in n-butyl alcohol.

iii Styrene Emission Tests 1000 g of the polyester resin were catalysed by the addition of 1.5% methyl ethyl ketone peroxide (SD2 grade ex Laporte Industries). The resin was then used to prepare a flat laminate 2.5′×2.5′ with a resin: glass ratio of 2:1 using 2 layers of 1½ oz chopped strand mat. The upper surface of the laminate was left exposed to the atmosphere. Five, twenty and thirty five minutes after preparation of the laminate had been completed, samples of air taken at a distance of 3″ above the centre of the laminate were collected and analysed for styrene content. The method, which is described in "The Determination of Toxic Substances In Air" (published by W. Heffer and Sons Ltd. Cambridge) pages 181 and 182 involves absorption of the styrene into ethyl alcohol, followed by measurement of optical density of the solution using U.V. spectrophotometer. An average figure for the styrene content of air above the laminate was then calculated from the three determinations. This procedure was repeated using samples of resin containing different amounts of poly (dibutyl fumarate).

Two series of such tests were carried out. The results were as follows:

Series 1. Conducted at an ambient temperature of 22° C.

| a. | Polyester resin without PDBF | 64.8 ppm styrene |
|---|---|---|
| b. | Polyester resin + 0.1% by wt. PDBF | 41.0 ppm styrene |

This clearly illustrated the reduced styrene emission of the resin containing PDBF.

Series 2. Conducted at an ambient temperature of 27° C.

| d. | Polyester resin + 0.01% PDBF | 62.1 pp styrene |
|---|---|---|
| e. | Polyester resin | |

-continued

|   |   |   |
|---|---|---|
| f. | + 0.1% PDBF Polyester resin + 1.0% PDBF | 65.9 pp styrene |
| g. | Polyester resin + 0.1% dibutyl fumarate (monomer) | 69.0 pp styrene<br>136.4 pp styrene |

In the second series of tests a sample of resin containing dibutyl fumarate monomer was included for comparison and it will be seen that the monomer does not have the styrene emission reducing qualities of the polymer.

It is believed that the increased styrene emission with increased PDBF content was caused by the presence of increasing amounts of Butanol which was being used as Solvent for the PDBF.

EXAMPLE 2

This example includes comparative tests using poly(-dibutylfumarate) in conjunction with various unsaturated monomers.

i Preparation of polyester resins

The resins used in the work consist of 59.5, 64.2 and 56.2% solutions in styrene, methyl methacrylate and vinyl toluene respectively of the following materials condensed together at 200° C. until a resin with an acid value of 20–27 mg KOH/g of solid resin was obtained.

Propylene Glycol   2.08 moles
Maleic anhydride   1.0 moles
Phthalic anhydride  1.0 moles The resins contained 0.008% hydroquinone as inhibitor, 0.15% hydrogenated castor oil as thixotropic additive, and 0.15% of a promotor consisting of cobalt siccatol containing 10% cobalt metal.

ii Emission Tests

A simple emission test was carried out for the purpose of this Example. The procedure for this was as follows:

26±0.3 g of resin was poured into a standard metal dish of diameter 7.2 cm and depth 1.3 cm. Monomer was allowed to evaporate freely from the resin, the dish being reweighed at 10 minute intervals over a period of 60 minutes. This procedure was carried out in the following experiments weight losses being quoted after periods of 20, 40 and 60 minutes.

iii Experimental

For each polymer solution an emission test was carried out on a sample containing no suppressant additive, as a control, and the same test was carried out on a sample to which had been added poly (dibutyl fumarate) in an amount of 0.1 parts by weight per 100 parts by weight of resin solution.

The results are tabulated below in Table I.

TABLE I

| Monomer | Styrene | | methyl methacrylate | | Vinyl Toluene | |
|---|---|---|---|---|---|---|
| Poly (dibutyl fumarate) added | NO | YES | NO | YES | NO | YES |
| Ambient temperature (°C.) | 24.5 | 24.5 | 24.5 | 24.5 | 23 | 23 |
| Weight Loss (g) by monomer evaporation after 20 mins. | 0.19 | 0.18 | 0.63 | 0.17 | 0.07 | 0.07 |
| 40 mins. | 0.36 | 0.30 | 1.24 | 0.26 | 0.14 | 0.13 |
| 60 mins. | 0.53 | 0.38 | 1.78 | 0.32 | 0.19 | 0.18 |

It will be noticed from these results that the effect of the suppressant is most marked with the most volatile monomer (methyl methacrylate) and only slight with the least volatile monomer (vinyl toluene).

EXAMPLE 3

This example includes comparative tests to show the effect of various polymers as emission suppressants. The Emission test used followed the same procedure as that used in Example 2, and the polyester solutions used were all the same as the styrene solution prepared in Example 2.

For each possible suppressant three samples were emission tested at the same time under exactly the same conditions; a control containing no suppressant, and samples containing 0.1 parts by weight per 100 parts by weight of solution of suppressant polymer and its monomer respectively.

The results for each control and polymeric additive are given below in Table II. In every case it was found that the monomer was not useful as a suppressant.

TABLE II

| Suppressant | NONE | Poly (2 ethyl hexyl acrylate) | NONE | Poly (didecyl itaconate) | NONE | Poly (hexyl methacrylate) |
|---|---|---|---|---|---|---|
| Ambient temperature (°C.) | 22 | 22 | 19 | 19 | 18 | 18 |
| Weight loss (g) by Styrene evaporation in 20 mins. | 0.16 | 0.16 | 0.18 | 0.15 | 0.20 | 0.17 |
| 40 mins. | 0.31 | 0.27 | 0.34 | 0.27 | 0.38 | 0.30 |
| 60 mins. | 0.45 | 0.35 | 0.51 | 0.36 | 0.55 | 0.38 |

| Suppressant | NONE | Poly (ethylene glycol) | Poly (methyl methacrylate) | NONE | Polycapro lactone | NONE | Poly (butyl acrylate) |
|---|---|---|---|---|---|---|---|
| Ambient temperature (°C.) | 27.5 | 27.5 | 27.5 | 26 | 26 | 21 | 21 |
| Weight Loss (g) after 20 mins. | 0.21 | 0.25 | 0.23 | 0.21 | 0.18 | 0.18 | 0.16 |
| 40 mins. | 0.41 | 0.47 | 0.41 | 0.38 | 0.35 | 0.35 | 0.25 |

TABLE II-continued

| 60 mins. | 0.59 | 0.67 | 0.58 | 0.57 | 0.53 | 0.52 | 0.32 |

From Table II it can be seen that the poly (ethylene glycol) and poly (methyl methacrylate) were detrimental to styrene vapour emission rather than suppressing it an the polycaprolactone had almost no effect. All the other polymers had a suppressant effect. It was noted that the two polymers which were detrimental were compatible with the polyester resin/styrene solution as was the polycaprolactone. The effective polymers all gave a hazy solution in the polyester resin/styrene solution and were considered to be partially incompatible. The molecular weights of all the above polymers were relatively low those of the poly(ethylene glycol) and the poly(caprolactone) being 600 and 4000 respectively. The other polymers were made by heating their monomers at a temperature of 80° C. in the presence of 1% Benzoyl peroxide. It was necessary to carry out the preparations of poly(2 ethyl hexyl acrylate) and poly(hexyl methacrylate) in the presence of a chain stopper in order to achieve controllable reactions. A 1% (by wt.) addition of stearyl mercaptan was found suitable for this purpose. The final viscosities (at 25° C.) of the polymers obtained were as follows: poly(dibutylfumarate) 145 poise; poly(2 ethyl hexyl acrylate) 30 poise; poly(didecyl itaconate) 3 poise; poly(hexyl methacrylate) 28 poise.

EXAMPLE 4

This example includes tests aimed at quantifying the "partial incompatibility" of the various polymers tested above.

Sample solutions of styrene emission suppressants were prepared using the polyester resin/styrene solution described in Example 2, and adding suppressant at a concentration of 0.1 parts by weight to 100 parts by weight of polyester solution.

The haze developed in these resin samples was measured using the 'Jackson Candle Turbidimeter' cited in the American Public Health Association Publication, 'Standard Methods for the Examination of Water and Wastewater including bottom sediments and sludges'.

Two "Unicam SP600" cells are required for the test. One cell is filled with the test resin and the other with resin which contains no suppressant. The latter represents a blank. The cells are positioned in a Sp600 Spectrophotometer and the optical density of the test resin measured at a light wavelength of 530 nm. The haziness is given in APHA units by multiplying the optical density by 133.

The table below lists the suppressants which have been examined in this work, together with a measure of the haziness developed when dispersed in the polyester resin/styrene solution. The table also includes details of the effectiveness of the various additives as styrene emission suppressants.

TABLE III

| Suppressant | Suppressant Effectiveness | Haziness (APHA units) |
|---|---|---|
| Poly (dibutyl fumarate) | Effective | 164 |
| Poly (2 ethyl hexyl acrylate) | Effective | 181 |
| Poly (didecyl itaconate) | Effective | 150 |
| Poly (hexyl methacrylate) | Effective | 138 |
| Poly (butyl acrylate) | Effective | 138 |
| Poly (ethylene glycol) | Non-effective | 0 |
| Poly (methyl methacrylate) | Non-effective | 0 |

These results show that all the additives which were effective to suppress styrene emission developed a haze whilst the ineffective polymers did not.

We conclude therefore that in the haziness test the haziness developed by effective polymers should be at least 120 ALPHA units. Totally incompatible polymers which separate out of the polyester resin/styrene solution are, of course, unsuitable for use in this invention since they would create unacceptable storage and handling problems for the polyester resin solution even if they were effective.

EXAMPLE 5

This example demonstrates the significance of thixotropy in the polyester resin solutions of this invention.

Two solutions of the polyester resin used in Example 2 were made up. One, designated as solution N was nonthixotropic and consisted of a 59.5% solution of the resin in styrene containing 0.008% hydroquinone as inhibitor and 0.15% of a promotor consisting of cobalt siccatol containing 10% cobalt metal.

The other, designated as solution T corresponded to solution N except that it was rendered thixotropic by the addition of 0.5% by weight of "Aerosil" and 0.2% by weight of dipropylene glycol.

Mixed samples of the solutions N and T were made up in various proportions to vary the degree of thixotropy of the sample and to each sample was added poly(dibutylfumarate) in an amount of 0.1 parts by weight per 100 parts by weight of solution.

The viscosity of each sample was measured with a Brookfield viscometer (Model RVT), using spindle No. 2 at 25° C., at 5 rpm and 50 rpm and the thixotropic index of each sample calculated using the formula $$\text{Thixotropic Index} = \frac{\text{Viscosity at 5 rpm}}{\text{Viscosity at 50 rpm}}$$

Emission tests were then carried out on all the samples, using the same procedure as in Example 2.

The results are tabulated below in Table IV.

TABLE IV

| Sample formulation | | | | | | |
|---|---|---|---|---|---|---|
| Solution T | 100 | 80 | 60 | 40 | 20 | 0 |
| Solution N | 0 | 20 | 40 | 60 | 80 | 100 |
| Poly (dibutyl fumarate) | 0.1 | 0.1 | 0.1 | 0.1 | 0.1 | 0.1 |
| Thixotropic properties | | | | | | |
| Viscosity at 5rpm (poise) | 18.8 | 14.8 | 10.4 | 6.4 | 3.6 | 2.8 |
| Viscosity at 50rpm (poise) | 7.76 | 6.8 | 5.8 | 4.56 | 3.6 | 2.88 |
| Thixotropic Index | 2.4 | 2.2 | 1.9 | 1.4 | 1.0 | 1.0 |
| Weight loss by styrene evap. | | | | | | |
| after 20 mins. (g) | 0.18 | 0.18 | 0.19 | 0.22 | 0.22 | 0.22 |
| 40 mins. (g) | 0.28 | 0.29 | 0.30 | 0.35 | 0.39 | 0.40 |
| 60 mins. (g) | 0.36 | 0.36 | 0.38 | 0.43 | 0.53 | 0.56 |
| Ambient | | | | | | |

TABLE IV-continued

| Temperature (°C.) | 23 | 23 | 23 | 23 | 23 | 23 |

These results show that the styrene emission suppression effect of the poly(dibutyl fumarate) is increased as the thixotropic index increases.

Direct comparison of thixotropic solutions with and without the suppressant was afforded by a further experiment.

In this case emission tests were carried out on five samples as follows (A) as control, the non-thixotropic solution N containing no suppressant, (B) solution T containing no suppressant (thixotropic index 1.94), (C) a thixotropic resin solution corresponding to solution T except that the aerosil and dipropylene glycol were replaced by 0.15% by weight of "Armogel"—a thixotropic additive consisting of hydrogenated castor oil—(thixotropic index 2.10), (D) and (E) corresponding to (B) and (C) respectively but each with the addition of 0.1 p.b.w. of poly(dibutyl fumarate) per 100 p.b.w. of solution.

These results are given below in Table V.

TABLE V

| SAMPLE | A | B | C | D | E |
|---|---|---|---|---|---|
| Weight loss (g) by evap. of styrene | | | | | |
| after 20 mins | 0.24 | 0.26 | 0.26 | 0.21 | 0.21 |
| 40 mins | 0.45 | 0.57 | 0.53 | 0.32 | 0.33 |
| 60 mins | 0.63 | 0.79 | 0.76 | 0.41 | 0.41 |

The ambient temperature in each case was 25° C.

It will be observed that the styrene emission of the thixotropic samples B and C containing no PDBF was worse than that of the non thixotropic control. The presence of PDBF in samples D and E reduces the styrene emission to well below the level of the control A.

A further comparative test showed that addition to the control sample A of 0.1 pbw of PDBF per 100 parts of solution had no suppressant effect on styrene emissions.

The result is given below as follows, the ambient temperature being 26° C.

TABLE VI

| PDBF added | NO | YES |
|---|---|---|
| weight loss (g) by styrene evap. after | | |
| 20 mins. | 0.25 | 0.24 |
| 40 mins | 0.42 | 0.44 |
| 60 mins | 0.58 | 0.58 |

We claim:

1. In a polyester resin composition for use in the preparation of resin/fibre laminates which comprises a solution of an unsaturated polyester resin in a volatile monomer, the improvement comprising incorporating in said composition a thixotropic agent and a polymer which is partially incompatible with the polyester resin solution said partially incompatible polymer being formed by addition polymerization using carbon-carbon unsaturation and whose monomeric unit consists essentially of an alkyl ester of an $\alpha\beta$ unsaturated di-basic carboxylic acid, whereby monomer vapor emission is substantially reduced.

2. A polyester resin composition according to claim 1 wherein said partially incompatible polymer is present in an amount in the range 0.1 to 1.0% by weight of the composition.

3. A polyester resin composition according to claim 1 or 25 wherein the partially incompatible polymer is a polymer of an alkyl fumarate or itaconate in which the alkyl groups contain 4 to 12 carbon atoms.

4. A polyester resin composition according to claim 1 wherein said partially incompatible polymer is a polymer of di-butyl fumarate or di-decyl itaconate.

* * * * *